(12) United States Patent
Sang

(10) Patent No.: US 8,788,834 B1
(45) Date of Patent: Jul. 22, 2014

(54) SYSTEMS AND METHODS FOR ALTERING THE STATE OF A COMPUTING DEVICE VIA A CONTACTING SEQUENCE

(75) Inventor: Xiaolu Sang, Rowland Heights, CA (US)

(73) Assignee: Symantec Corporation, Mountain View, CA (US)

( * ) Notice: Subject to any disclaimer, the term of this patent is extended or adjusted under 35 U.S.C. 154(b) by 394 days.

(21) Appl. No.: 12/787,246

(22) Filed: May 25, 2010

(51) Int. Cl.
 *G06F 21/00* (2013.01)
(52) U.S. Cl.
 USPC ................................ 713/183; 726/4; 726/17
(58) Field of Classification Search
 USPC ........................................ 713/183; 726/4, 17
 See application file for complete search history.

(56) References Cited

U.S. PATENT DOCUMENTS

| | | | | |
|---|---|---|---|---|
| 4,455,588 A * | 6/1984 | Mochida et al. | ............. | 340/5.54 |
| 5,559,961 A * | 9/1996 | Blonder | ............. | 726/18 |
| 6,754,546 B1 * | 6/2004 | Hindus et al. | ............. | 700/94 |
| 6,954,862 B2 * | 10/2005 | Serpa | ............. | 726/5 |
| 7,188,314 B2 * | 3/2007 | Mizrah | ............. | 715/741 |
| 7,657,849 B2 | 2/2010 | Chaudhri et al. | | |
| 7,793,225 B2 * | 9/2010 | Anzures et al. | ............. | 715/772 |
| 8,046,721 B2 * | 10/2011 | Chaudhri et al. | ............. | 715/863 |
| 8,117,458 B2 * | 2/2012 | Osborn et al. | ............. | 713/183 |
| 8,452,260 B2 * | 5/2013 | Matsuoka | ............. | 455/411 |
| 2003/0093699 A1 * | 5/2003 | Banning et al. | ............. | 713/202 |
| 2004/0030934 A1 * | 2/2004 | Mizoguchi et al. | ............. | 713/202 |
| 2004/0088588 A1 * | 5/2004 | Awada et al. | ............. | 713/202 |
| 2005/0060554 A1 * | 3/2005 | O'Donoghue | ............. | 713/183 |
| 2005/0253817 A1 * | 11/2005 | Rytivaara et al. | ............. | 345/173 |
| 2006/0174339 A1 * | 8/2006 | Tao | ............. | 726/18 |
| 2007/0277224 A1 * | 11/2007 | Osborn et al. | ............. | 726/2 |
| 2007/0281666 A1 * | 12/2007 | Yoshida | ............. | 455/411 |
| 2008/0122796 A1 | 5/2008 | Jobs et al. | | |
| 2008/0136587 A1 * | 6/2008 | Orr | ............. | 340/5.31 |
| 2010/0043062 A1 * | 2/2010 | Alexander et al. | ............. | 726/6 |
| 2010/0328033 A1 * | 12/2010 | Kamei | ............. | 340/5.82 |
| 2011/0202982 A1 * | 8/2011 | Alexander et al. | ............. | 726/7 |
| 2011/0279384 A1 * | 11/2011 | Miller et al. | ............. | 345/173 |

OTHER PUBLICATIONS

Musipass: Authenticating Me Softly with "My" Song; Marcia Gibson, Karen Renaud, Marc Conrad, Carsten Maple; NSPW'09, Sep. 8-11, 2009, Oxford, United Kingdom; Copyright 2010 ACM 978.*

TapSongs: Tapping Rhythm-Based Passwords on a Single Binary Sensor; Jacob O. Wobbrock; UIST'09, Oct. 4-7, 2009, Victoria, British Columbia, Canada. Copyright 2009 ACM.*

Internet article, The BS Review, Hack Your Google Droid Simply by Pressing the Back Button, http://www.thebsreview.com/?p=3765, date unknown.

Internet article, Published: The mother of all iPhone patents, http://brainstormtech.blogs.fortune.cnn.com/2008/06103/published-the-mother-of-all-iphone-patents, date unknown.

Internet article, Apple, Phone & iPad Forums, News, Mods, Guides, Themes, Skins, and Downloads is What We Do!, http://modmyi.com/forums/general-iphone-chat/165191-tap-unlock.html, date unknown.

* cited by examiner

*Primary Examiner* — Luu Pham
*Assistant Examiner* — James Turchen
(74) *Attorney, Agent, or Firm* — Holland & Hart LLP

(57) ABSTRACT

A computer-implemented method for altering the state of a computing device via a contacting sequence is described. A contacting sequence is detected on a display of the computing device in a first state. The contacting sequence is compared to at least one contacting sequence stored in a database. A determination is made whether the detected contacting sequence matches at least one contacting sequence stored in the database. If the detected sequence matches at least one contacting sequence stored in the database, the first state of the computing device is altered to a second state.

8 Claims, 9 Drawing Sheets

SYSTEMS AND METHODS FOR ALTERING THE STATE OF A COMPUTING DEVICE VIA A CONTACTING SEQUENCE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Computing systems may be mobile so that users may carry these systems as they travel, shop, work, etc. Mobile computing systems may enter a "locked" state after a predetermined of time (e.g., after receiving a specific command from a user input, when powered up, and the like). This locked state may prevent unauthorized users from accessing data that may be stored on the system. In addition, the locked state may prevent unauthorized users from accessing various features and functions of the system. In order to unlock a system, a user may be required to enter a password or other credential via a user input on the system. This may require the user to look at the system in order to correctly enter the credential. This may be inconvenient in certain situations. As a result, benefits may be realized by providing system and methods for altering the state of a computing system via a contacting sequence.

SUMMARY

According to at least one embodiment, a computer-implemented method for altering the state of a computing device via a contacting sequence is described. A contacting sequence is detected on a display of the computing device in a first state. The contacting sequence is compared to at least one contacting sequence stored in a database. A determination is made whether the detected contacting sequence matches at least one contacting sequence stored in the database. If the detected sequence matches at least one contacting sequence stored in the database, the first state of the computing device is altered to a second state.

In one embodiment, the first state of the computing device may be maintained if the detected sequence does not match at least one contacting sequence stored in the database. The first state may be a locked state. The second state may be an unlocked state.

A portion of a website may be displayed on the display of the computing device. The website may request a password in order to display the full website. A determination may be made as to whether the detected contacting sequence maps to a password stored in the database. The password may be associated with the website. The full website may be displayed if the detected sequence maps to the password stored in the database.

In one configuration, the display is a touch-screen. Feedback data may be provided as the contacting sequence is detected on the display. The feedback data may indicate if the contacting sequence is being entered correctly.

A computing device configured to alter the state of the computing device via a contacting sequence is also described. The device may include a processor and memory in electronic communication with the processor. The device may further include a sequence recognizing module. The module may be configured to detect a contacting sequence on a display of the computing device in a first state and compare the contacting sequence to at least one contacting sequence stored in a database. The module may be further configured to determine whether the detected contacting sequence matches at least one contacting sequence stored in the database. If the detected sequence matches at least one contacting sequence stored in the database, the module may be configured to alter the first state of the computing device to a second state.

A computer-program product for altering the state of a computing device via a contacting sequence is also described. The computer-program product may include a computer-readable medium having instructions thereon. The instructions may include code programmed to detect a contacting sequence on a display of the computing device in a first state, and code programmed to compare the contacting sequence to at least one contacting sequence stored in a database. The instructions may further include code programmed to determine whether the detected contacting sequence matches at least one contacting sequence stored in the database. If the detected sequence matches at least one contacting sequence stored in the database, the instructions may include code programmed to alter the first state of the computing device to a second state.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
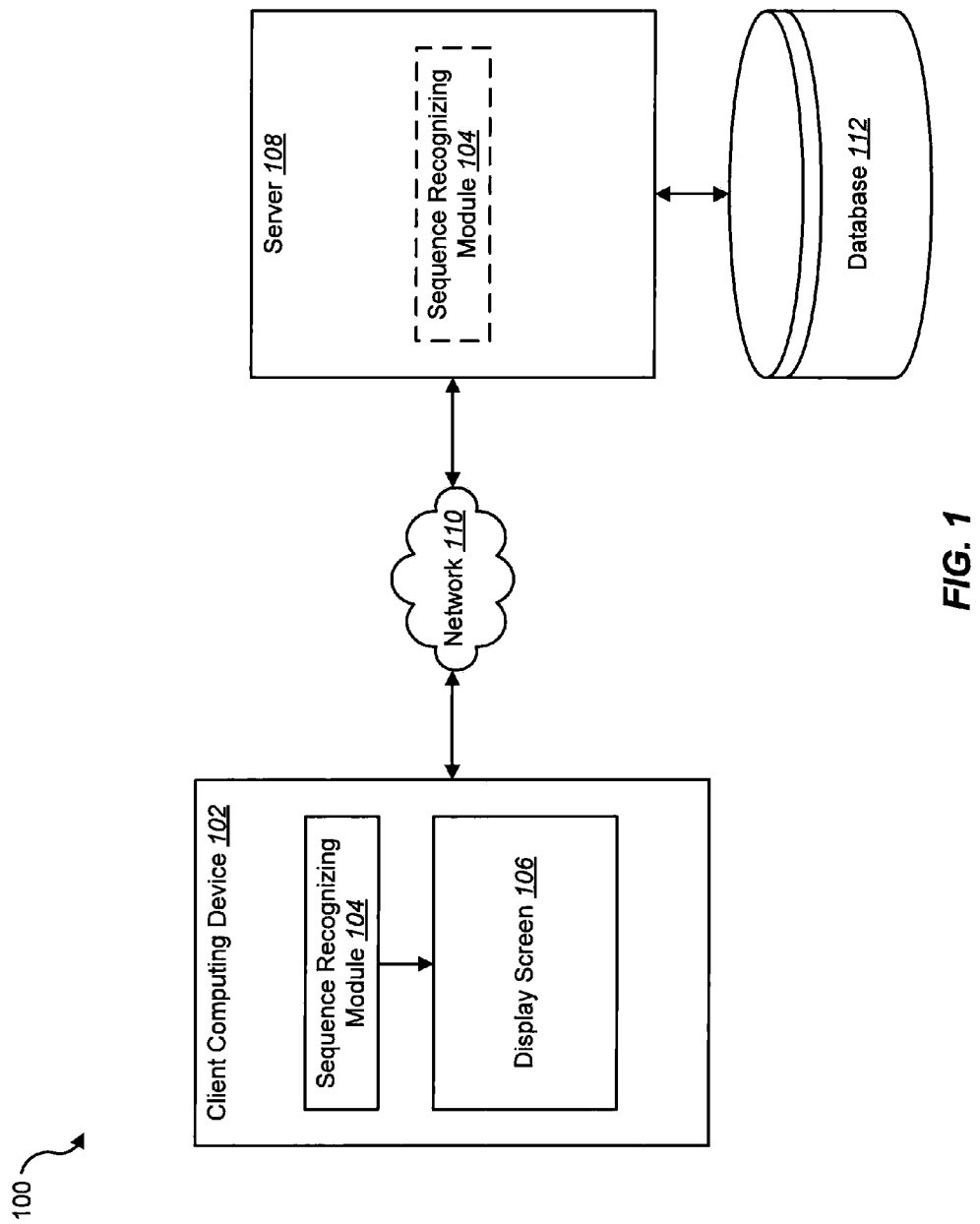
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The use of devices with touch-screens has increased dramatically over the recent years. Examples of these devices may include, but is not limited to, mobile devices (cell phones, personal digital assistants (PDAs), etc.), netbooks, iPads, cameras, global positioning system (GPS) devices, alarm systems, and the like. In one example, the device may be a pocket-sized computing device that typically includes a display screen with touch input and/or a miniature keyboard. The input and output of some devices may be combined into a touch-screen interface. Some of these devices may provide the convenience of a conventional computer to a user in environments where carrying a conventional computer (e.g., laptop) would not be practical.

These devices may include firmware that enables the device to be locked. When a device is locked, unauthorized users may be prevented from accessing data stored on the device. Unauthorized users may also be prevented from accessing the various features and functions of the device. A user may lock the device by entering a password or other type of locking command. In addition, the device may enter a locked state after the device is idle for a predetermined period of time, when the device is powered on, etc. In order to unlock the device, a user may be required to enter a personal identification number (PIN) or other type of password. In addition, some devices may require the user to recreate a specific pattern on the touch-screen of the device. For example, the user may be required to slide a finger across a specific portion of a touch-screen, touch specific portions of the touch-screen in a predetermined pattern, and the like.

Current ways to unlock a device (e.g., entering a PIN, touching a specific portion of the touch-screen, recreating a pattern on the screen, etc.) may require the user to look at the device. Requiring a user to look at the device may cause inconveniences. Further, looking at the device in order to enter a PIN or other type of password may be dangerous for the user in some situations. For example, it may be inconvenient and dangerous while the user is driving a vehicle to look at the screen of the device in order to enter a PIN to unlock the device. These inconveniences may deter users from locking their device. As a result, this may create a security risk for data stored on a device if the device were to fall into the wrong hands.

In one embodiment, the present systems and methods may provide contacting sequence detector in order to detect a contacting sequence executed by a user on the display of a device in order to lock or unlock the device. For example, the detector may detect a tapping sequence executed by the user on the display of the device. A contacting sequence may include a user tapping the surface of a display screen with his/her finger(s), a stylus apparatus, or any other type of instrument that may be used to tap the surface of a display screen. Each tap may have a predetermined length. Similarly, the delay between each tap may be for a predetermined duration. In addition, the contacting sequence may include the depression of one or more areas of the device (e.g., display, keypad, etc.)

The use of a contacting sequence may reduce or eliminate the need for the user to look at the display while providing the contacting sequence. The present systems and methods may allow a user to record a contacting sequence into a device, such as, without limitation, a phone, by using a touch-screen. To unlock the device, the user may simply tap a preconfigured sequence on any area of the touch-screen and a contacting sequence detector may recognize the sequence and unlock the device if the sequence is entered correctly. The present systems and methods may take into account the number of taps, the duration of individual taps, delays between taps, and the like.

FIG. 1 is a block diagram illustrating one embodiment of an environment 100 in which the present systems and methods may be implemented. In one configuration, a client computing device 102 may include a sequence recognizing module 104 and a display screen 106. In one example, the client computing device 102 may be a mobile communications device, a cell phone device, a handheld device, a handheld computer, a smartphone, a PDA, a netbook, iPad, camera, GPS device, alarm system, or any other type of computing device that may include a touch-screen.

The display screen 106 may be a touch-screen that displays information to a user. In one embodiment, the touch-screen may receive input via a single point of contact (single touch) and/or multiple points of contact (multi-touch). The user may interface with the client computing device 102 via the display screen 106. For example, the user may tap a preconfigured sequence on the touch-screen.

The sequence may cause the computing device 102 to change from one state to another. For example, the sequence may cause the computing device 102 to change from a locked state to an unlocked stated.

The sequence recognizing module 104 may detect and analyze the contacting sequence that the user performed on the display screen 106. In one embodiment, the client computing device 102 may download the sequence recognizing module 104 from a server 108. The client computing device 102 and the server 108 may communicate across a network connection 110. The network connection 110 may be the Internet, a wide area network (WAN), a local area network (LAN), a virtual private network (VPN), an intranet, and the like. In one example, the server 108 may include or be in communication with a database 112. The database 112 may store one or more preconfigured contacting sequences that may be used to alter the state of the client computing device 102.

Figure 2:
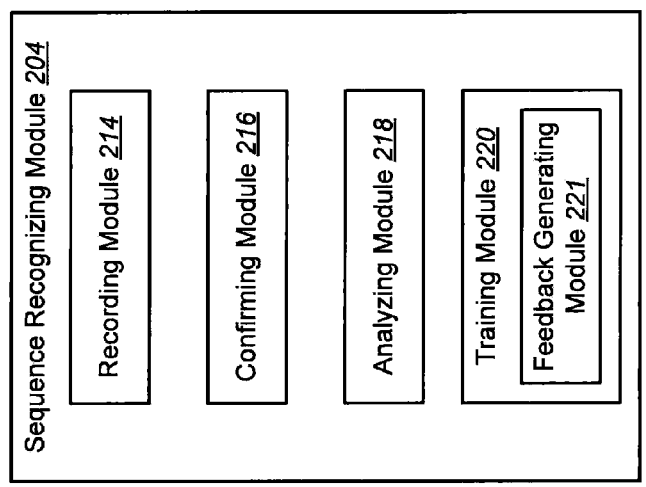
FIG. 2 is a block diagram illustrating a further embodiment of a sequence recognizing module.

FIG. 2 is a block diagram illustrating a further embodiment of a sequence recognizing module 204. The sequence recognizing module 204 may detect and analyze various sequences provided on the display screen 106. As previously stated, the display screen 106 may be a touch-screen that supports single points of contact an multiple points of contact from a user. In other words, the user may touch, or use an instrument to contact, more than one point on the touch-screen at the same time (i.e., multi-touch). In one configuration, the recognizing module 204 may include a recording module 214, a confirming module 216, an analyzing module 218, and a training module 220.

The recording module 214 may record a contacting sequence proved by a user. The user may provide the contacting sequence via the display screen 106, such as a touch-screen. In other words, the user may tap a particular sequence on the display screen 106. The recording module 214 may record the number of taps, the duration of each tap, the delay between taps, and the like. The confirming module 216 may request the user to provide the contacting sequence an additional time. For example, the user may provide the contacting sequence a first time and the recording module 214 may record the sequence. The confirming module 216 may request the user to provide the contacting sequence a second time. In one embodiment, the confirming module 216 may compare the first contacting sequence and the second contacting sequence in order to confirm whether or not the second contacting sequence matches the first contacting sequence. If the second contacting sequence is confirmed to match the first contacting sequence, the sequence may be stored in the database 112.

The analyzing module 218 may analyze a contacting sequence provided by the user. The analyzing module 218 may determine whether a particular contacting sequence matches a contacting sequence that has been previously confirmed by the confirming module 216 and stored in the database 112.

In one configuration, the training module 220 may train a user with regards to a contacting sequence. For example, the training module 220 may request the user to provide a recorded and confirmed contacting sequence at different speeds. The various differences in the duration of individual taps, delay between taps, etc. between the different speeds may be recorded and analyzed by the analyzing module 218. The various speeds may be averaged with the recorded and confirmed contacting sequence so that if the user provides the contacting sequence at a speed that is faster than the speed which the user initially provided the contacting sequence, the analyzing module 218 may still be able to confirm whether or not the contacting sequence (entered at a faster speed) matches a previously recorded, confirmed, and stored sequence (entered at a slower speed).

Further, training module 220 may include a feedback generating module 220. In one configuration, the feedback generating module 221 may generate feedback to train or assist the user in providing a contacting sequence. For example, as the user enters a contacting sequence, the feedback generating module 221 may provide a visual or audio indicator to inform the user if the contacting sequence is being entered correctly or incorrectly. In one example, the feedback generating module 221 may produce a visual icon (such as a bubble) each time a tap in a sequence is detected. The bubble may be a certain color, shape, etc. to indicate to the user that the detected tap is correct (or incorrect).

Figure 3:
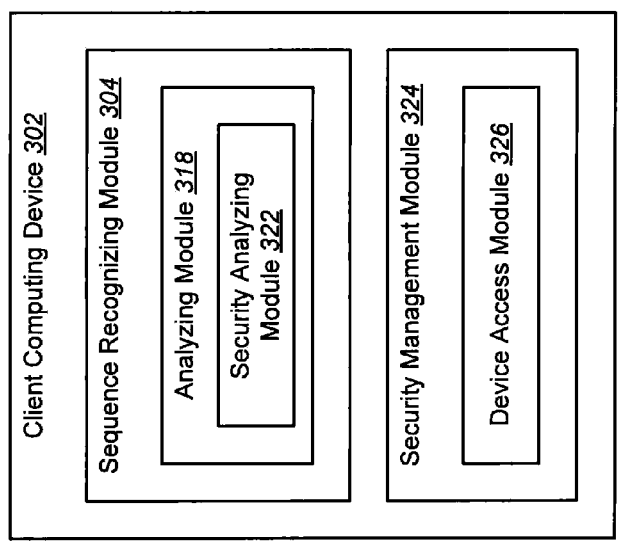
FIG. 3 is a block diagram illustrating a further embodiment of a client computing device.

FIG. 3 is a block diagram illustrating a further embodiment of a client computing device 302. As previously mentioned, the client computing device 302 may include a sequence recognizing module 304. The client computing device 302 may further include a security management module 324.

In one configuration, the sequence recognizing module 304 may include an analyzing module 318. The analyzing module 318 may further include a security analyzing module 322. The security analyzing module 322 may analyze a contacting sequence that a user has provided via the display screen 106, such as a touch-screen. The security analyzing module 322 may analyze the contacting sequence to determine if the sequence matches a sequence that has been previously recorded, confirmed, and stored in the database 112.

In one embodiment, the security management module 324 may include a device access module 326. The device access module 326 may alter the state of the client computing device 302 in order to allow or prevent access to the device 302. For example, the client computing device 302 may be in a locked state. The security analyzing module 322 may analyze a contacting sequence received from the user via the display 106 and determine that the contacting sequence matches a sequence stored in the database 112. The device access module 326 may then unlock the client computing device 302 so that the user may have access to the various features and functions of the client computing device 302.

As another example, the client computing device 302 may be in an unlocked state. The device access module 326 may lock or secure the client computing device 302 if the security analyzing module 322 confirms that a received contacting sequence matches a previously stored sequence. If, however, a received contacting sequence does not match a previously stored sequence, the device access module 326 may not alter the state of the client computing device 302. As a result, if the client computing device 302 is in a locked state, the device 302 may remain in the locked state.

Figure 4:
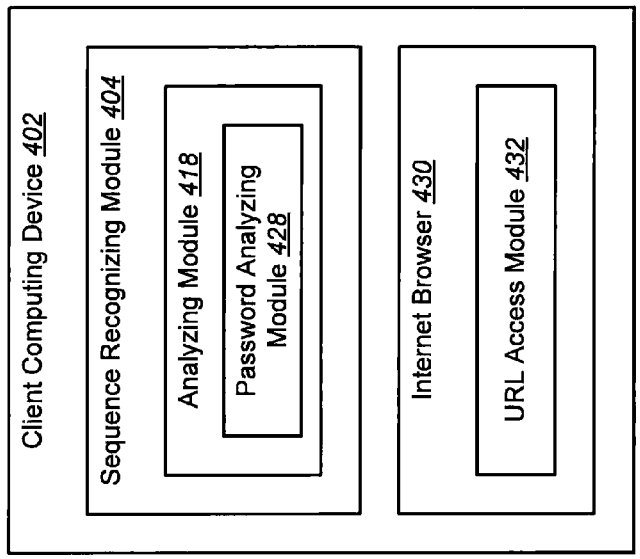
FIG. 4 is a block diagram illustrating a further embodiment of a client computing device.

FIG. 4 is a block diagram illustrating a further embodiment of a client computing device 402. The device 402 may include a sequence recognizing module 404 and an Internet browser 430. The sequence recognizing module 404 may include an analyzing module 418, and the Internet browser 430 may include a uniform resource locator (URL) access module 432.

In one configuration, the analyzing module 418 may include a password analyzing module 428. The password analyzing module 428 may analyze a contacting sequence and determine if the sequence maps to a previously stored password for a particular webpage. For example, a user may access a website via the Internet browser 430. The website may request a password in order to access information included on one or more webpages of the website. If the user has not previously recorded a password for the website, the user may provide a password. The password may be provided via a keyboard input. The password may then be stored in the database 112.

In addition, the user may associate a contacting sequence with the stored password. For example, the user may provide a contacting sequence on the display screen 106 that is then mapped or linked to the password stored in the database 112. As a result, when the user accesses the website, the user may provide the contacting sequence via the display screen 106 instead of typing the password via the keyboard input. The password analyzing module 428 may determine if the contacting sequence is mapped or linked to the stored password for the website. If the contacting sequence is linked to the stored password, the URL access module 432 may allow one or more webpages of the website to be accessed by the user.

Figure 5:
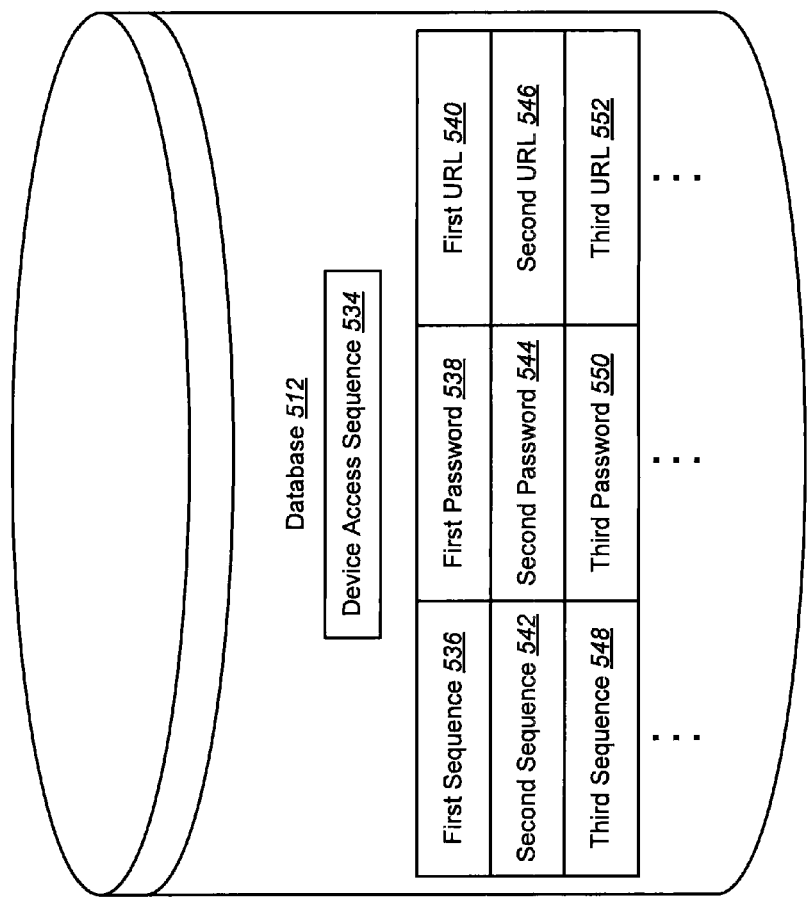
FIG. 5 is a block diagram illustrating a further embodiment of a database.

FIG. 5 is a block diagram illustrating a further embodiment of a database 512. In one configuration, the database 512 may store a device access sequence 534. The device access sequence 534 may be a stored contacting sequence that was previously recorded and confirmed. When a user provides a contacting sequence via the display screen 106, subsequent to the time the device access sequence 534 was stored, the computing device 102 may alter a state if the provided contacting sequence matches the device access sequence 534. For example, if the contacting sequence matches the device access sequence 534, the client computing device 102 may change from a locked state to an unlocked state. Alternatively, if the contacting sequence matches the device access sequence 534, the computing device 102 may change from an unlocked state to a locked state.

The database 512 may also store one or more additional contacting sequences 536, 542, 548 that are mapped (or linked) to one or more passwords 538, 544, 550. The passwords 538, 544, 550 may be associated with one or more websites located at a particular URL 540, 546, 552. In one embodiment, a first URL 540 may be associated with a first password 538. The first password 538 may be further linked with a first contacting sequence 536.

For a user to access the website associated with the first URL 540, the user may be required to provide the first password 538. The first password 538 may include numbers, letters, or any other symbol provided by a keyboard input. In one embodiment, instead of providing the first password 538 via the keyboard input, the user may provide the first contacting sequence 536 that is mapped (or linked) to the first password 538. In other words, the user may tap the first sequence 536 on the display screen 106 with a tapping instrument (e.g., finger, stylus, etc.) when the website associated with the first URL 540 requests a password. If the first contacting sequence 536 is entered correctly, the sequence 536 may be mapped to the first password 538, and the website associated with the first URL 540 may be accessed by the user. In other words, the first sequence 536 may be translated to the first password 538 and the first URL 540 may be accessed by the user. As a result, the user may provide the first password 538 (via the first sequence 536) without having to look at the client computing device 102 to enter the password 538 via a keyboard input.

The websites associated with the second and third URLs 546, 552 may be accessed in a similar manner as described above. The second URL 546 may be associated with a second password 544 and the third URL 552 may be associated with a third password 550. In one embodiment, a second sequence 542 may be mapped to the second password 544 and a third sequence 548 may be mapped to the third password 550. While only three URLs, passwords, and sequences are illustrated, it is to be understood that the database 512 may store more of less than three URLs, passwords, and contacting sequences.

Figure 6:
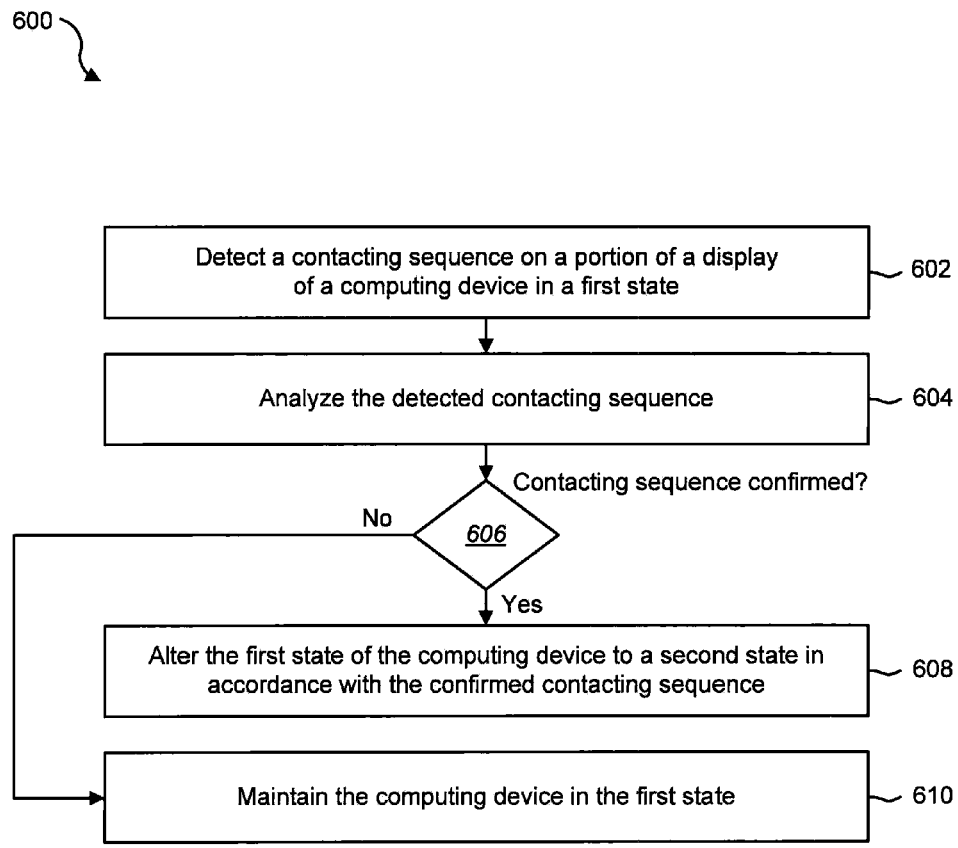
FIG. 6 is a flow diagram illustrating one embodiment of a method for analyzing a contacting sequence in order to alter the state of a computing device.

FIG. 6 is a flow diagram illustrating one embodiment of a method 600 for altering the state of a computing device via a contacting sequence. In one embodiment, the method 600 may be implemented by the sequence recognizing module 104.

In one configuration, a contacting sequence may be detected 602 on a portion of a display screen 106 of a computing device 102. The display 106 may be a touch-screen. The contacting sequence may be provided on the display screen 106 via a contacting instrument touching or contacting the display screen 106 in a preconfigured sequence. In one example, the computing device 102 may be in a first state. As an example, the computing device may be in a locked state. In other words, some or all of the functions and features of the computing device 102 may be inaccessible. The contacting sequence may be detected 602 on any portion of the display 106.

The detected contacting sequence may be analyzed 604. A determination 606 may be made as to whether the detected contacting sequence is confirmed. For example, a determination 606 may be made as to whether the detected contacting sequence matches a contacting sequence previously stored in the database 112. If it is determined 606 that the contacting sequence is not confirmed, the computing device 102 may be maintained 610 in the first state. If, however, it is determined 606 that the contacting sequence is confirmed, the first state of the computing device 102 may be altered 608 to a second state in accordance with the confirmed contacting sequence. For example, the first state may be a locked state. The confirmed contacting sequence may cause the locked state to be altered to an unlocked state. As a result, some or all of the various features and functions of the computing device 102 may be accessible.

Figure 7:
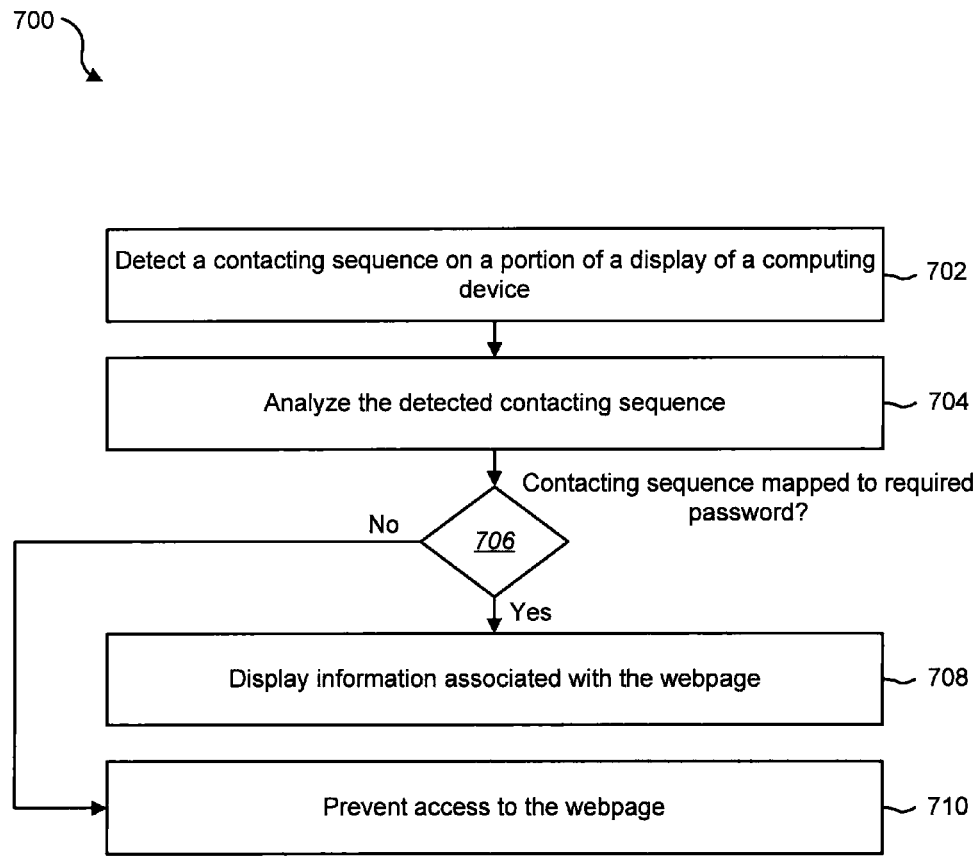
FIG. 7 is a flow diagram illustrating one embodiment of a method 700 for confirming a contacting sequence in accordance with a password for a particular webpage.

FIG. 7 is a flow diagram illustrating one embodiment of a method 700 for confirming a password for a website via a contacting sequence. In one embodiment, the method 700 may be implemented by the sequence recognizing module 104.

In one configuration, a webpage of a website may be displayed to a user. The webpage may request a password in order to access information on the webpage. In one embodiment, a contacting sequence may be detected 702 on a portion of the display 106 of the computing device 102. The detected contacting sequence may be analyzed 704. A determination 706 may be made as to whether the contacting sequence maps to the password associated with the webpage. If it is determined 706 that the contacting sequence does not map to the required password, access to the webpage may be prevented 710. If, however, it is determined 706 that the contacting sequence does map to the password stored for the webpage, the information associated with the webpage may be displayed 708.

Figure 8:
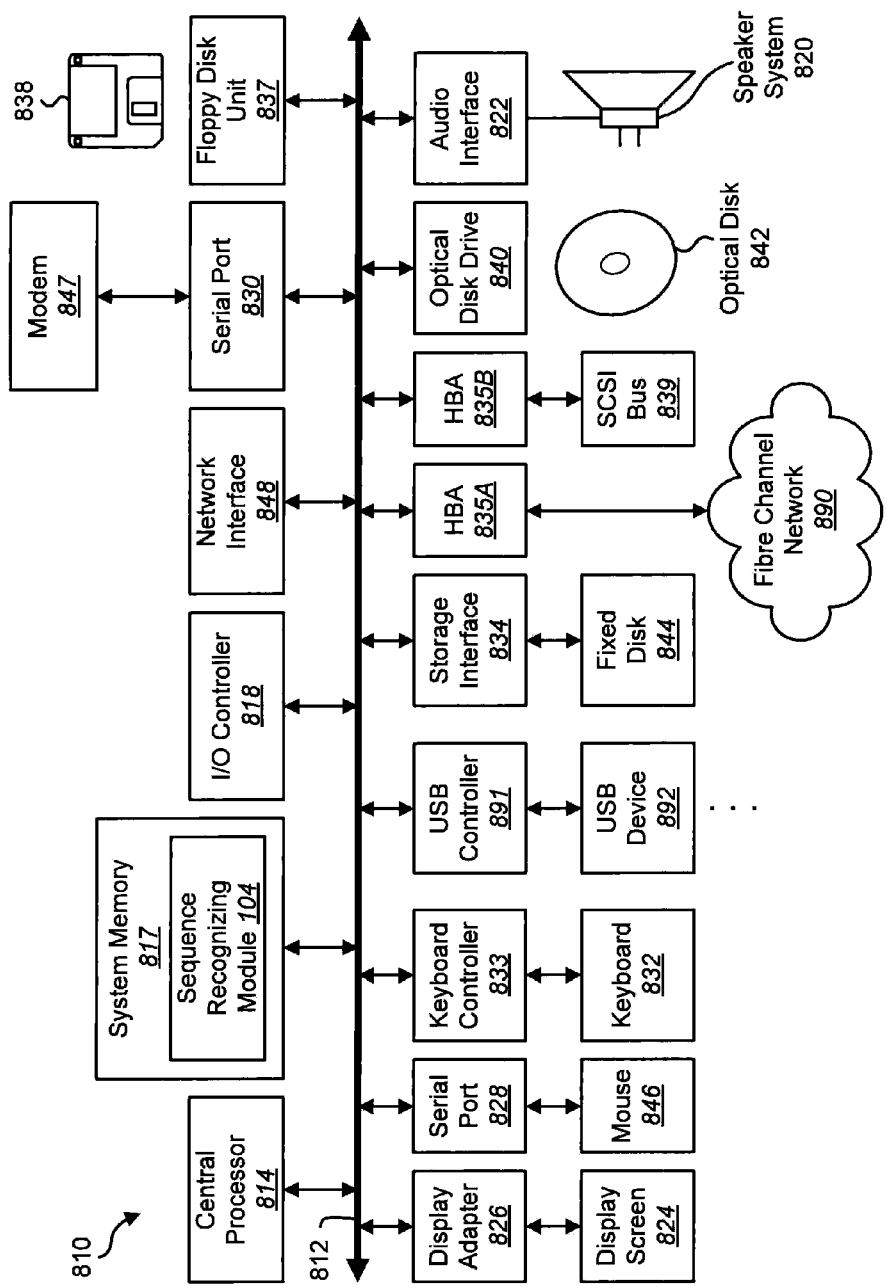
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 890), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the sequence recognizing module 104 to implement the present systems and methods may be stored within the system memory 817. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
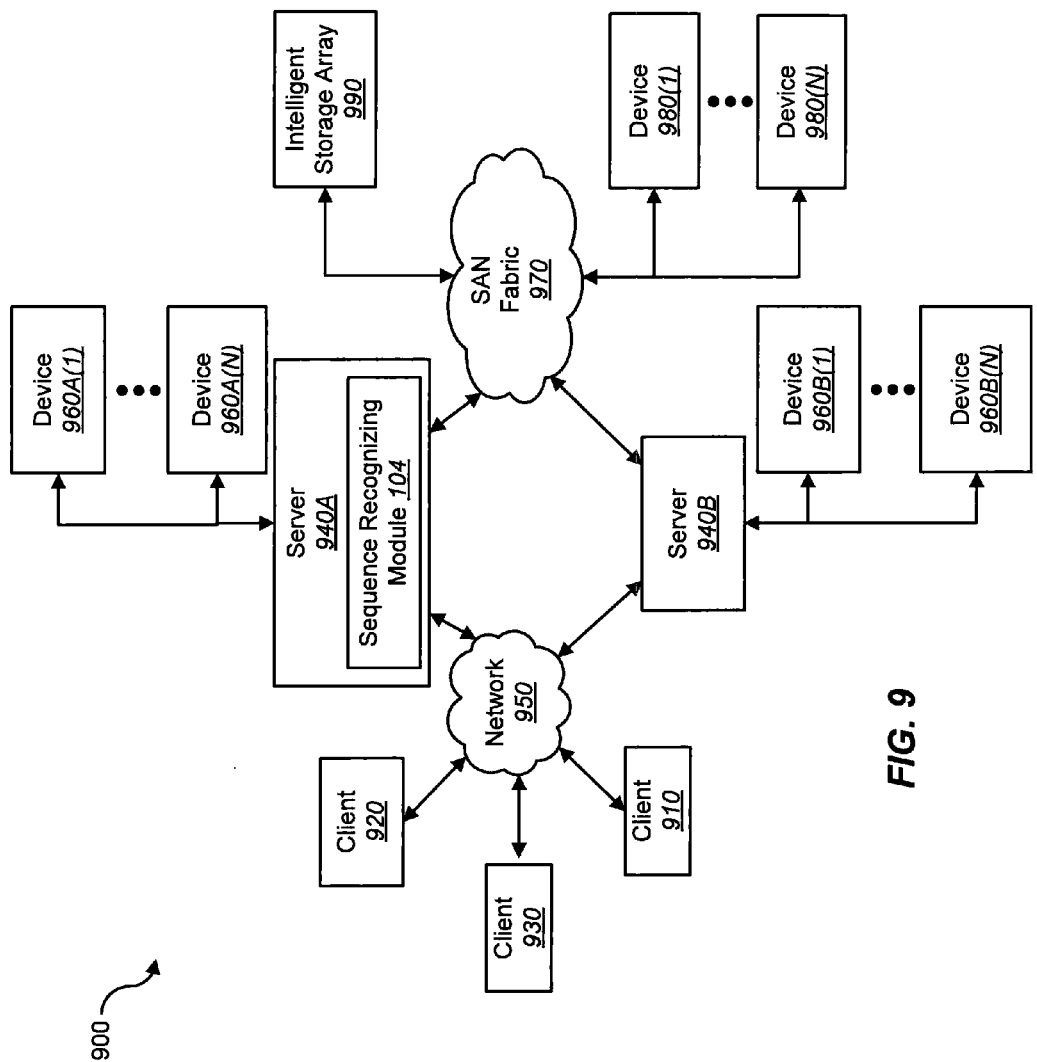
FIG. 9 is a block diagram depicting a network architecture in which client systems, as well as storage servers (any of which can be implemented using computer system), are coupled to a network.

FIG. 9 is a block diagram depicting a network architecture 900 in which client systems 910, 920 and 930, as well as storage servers 940A and 940B (any of which can be implemented using computer system 910), are coupled to a network 950. In one embodiment, the sequence recognizing module 104 may be located within a server 940A, 940B to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920, and 930 to network 950. Client systems 910, 920, and 930 are able to access information on storage server 940A or 940B using, for example, a web browser or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for altering the state of a computing device via a contacting sequence, comprising:
    displaying a portion of a website with a first Uniform Resource Locator (URL) on a touch screen of the computing device, wherein the website comprises a request for a password in order to permit access to a restricted portion of the website;
    detecting, independent of a location on the touch screen of the computing device, the contacting sequence of an input to the touch screen of the computing device in a first state, the contacting sequence comprising a rhythmic tapping sequence of one or more taps on the touch screen, the one or more taps comprising a predetermined length, a delay between the one or more taps comprising a predetermined duration;

comparing the contacting sequence to at least one contacting sequence stored in a database;

determining whether the detected contacting sequence matches a first sequence stored in the database;

upon determining that the detected sequence matches the first sequence stored in the database, determining whether the first sequence maps to a first password stored in the database and whether the first password maps to the first URL; and upon determining the first sequence maps to the first password and that the first password maps to the first URL, permitting access to the restricted portion of the website.

2. The method of claim 1, further comprising denying access to the restricted portion of the website if the detected sequence does not match at least one contacting sequence stored in the database.

3. The method of claim 1, further comprising providing feedback data as the contacting sequence is detected on the touch screen, wherein the feedback data indicates if the contacting sequence is being entered correctly.

4. A computing device configured to alter the state of the computing device via a contacting sequence, comprising:

a processor;

memory in electronic communication with the processor;

instructions stored in the memory, the instructions being executable by the processor to:

display a portion of a website with a first Uniform Resource Locator (URL) on a touch screen of the computing device, wherein the website comprises a request for a password in order to permit access to a restricted portion of the website;

detect, independent of a location on the touch screen of the computing device, the contacting sequence of an input to the touch screen of the computing device in a first state, the contacting sequence comprising a rhythmic tapping sequence of one or more taps on the touch screen, the one or more taps comprising a predetermined length, a delay between the one or more taps comprising a predetermined duration;

compare the contacting sequence to at least one contacting sequence stored in a database;

determine whether the detected contacting sequence matches a first sequence stored in the database;

upon determining that the detected sequence matches the first sequence stored in the database, determine whether the first sequence maps to a first password stored in the database and whether the first password maps to the first URL; and upon determining the first sequence maps to the first password and that the first password maps to the first URL, permit access to the restricted portion of the website.

5. The computing device of claim 4, wherein the instructions are further executable by the processor to deny access to the restricted portion of the website if the detected sequence does not match at least one contacting sequence stored in the database.

6. The computing device of claim 4, wherein the instructions are further executable by the processor to provide feedback data as the contacting sequence is detected on the touch screen, wherein the feedback data indicates if the contacting sequence is being entered correctly.

7. A computer-program product for altering the state of a computing device via a contacting sequence, the computer-program product comprising:

a non-transitory computer-readable storage medium storing instructions thereon, the instructions being executable by a processor to:

display a portion of a website with a first Uniform Resource Locator (URL) on a touch screen of the computing device, wherein the website comprises a request for a password in order to permit access to a restricted portion of the website;

detect, independent of a location on the touch screen of the computing device, the contacting sequence of an input to the touch screen of the computing device in a first state, the contacting sequence comprising a rhythmic tapping sequence of one or more taps on the touch screen, the one or more taps comprising a predetermined length, a delay between the one or more taps comprising a predetermined duration;

compare the contacting sequence to at least one contacting sequence stored in a database;

determine whether the detected contacting sequence matches a first sequence stored in the database;

upon determining that the detected sequence matches the first sequence stored in the database, determine whether the first sequence maps to a first password stored in the database and whether the first password maps to the first URL; and upon determining the first sequence maps to the first password and that the first password maps to the first URL, permit access to the restricted portion of the website.

8. The computer-program of claim 7, wherein the instructions are further executable by the processor to deny access to the restricted portion of the website if the detected sequence does not match at least one contacting sequence stored in the database.

* * * * *